Feb. 26, 1952  F. M. STADELMANN  2,587,008
DENTAL APPLIANCE
Filed Oct. 12, 1950

INVENTOR.
FRANCISCO MORENO STADELMANN
BY
Wm. H. Dean
AGENT

Patented Feb. 26, 1952

2,587,008

UNITED STATES PATENT OFFICE 2,587,008

DENTAL APPLIANCE

Francisco Moreno Stadelmann,
Mexico City, Mexico

Application October 12, 1950, Serial No. 189,817
In Mexico October 27, 1949

4 Claims. (Cl. 32—33)

My invention relates to a dental appliance, and more particularly to an appliance for evacuating saliva and other fluids from the mouth of a patient during dental operations, and the objects of my invention are:

First, to provide an appliance of this class which very efficiently removes saliva and other fluids from the sub-lingual and vestibular area of a patient's mouth, permitting the dentist to obtain a clear, unobstructed view of the lower teeth and surrounding tissues, which greatly facilitates operation thereon;

Second, to provide an appliance of this class which is very simple and easy to insert in the mouth of a patient;

Third, to provide an appliance of this class which effectively retains the patient's tongue, preventing the same from obstructing operations in the patient's mouth;

Fourth, to provide an appliance of this class in which a spring-loaded plate engages the chin of the patient for securely maintaining the saliva-ejecting manifold in proper position in the sub-lingual and vestibular areas of the patient's mouth for removing saliva from the lowermost portions of the mouth and saliva secreted by the parotid gland in the vestibular area of the mouth;

Fifth, to provide an appliance of this class having a novel thumb plate and spring-loaded chin plate which may be engaged by the fingers of the operator for compressing the spring which loads the chin plate, whereby facility in inserting the appliance in a patient's mouth is promoted, and which requires the use of only one hand of the operator;

Sixth, to provide an appliance of this class which is very compact and easy to maintain in sterile condition; and Seventh, to provide an appliance of this class which is very simple and economical of construction, efficient in operation, and which will not readily deteriorate or get out of order.

Figure 1:
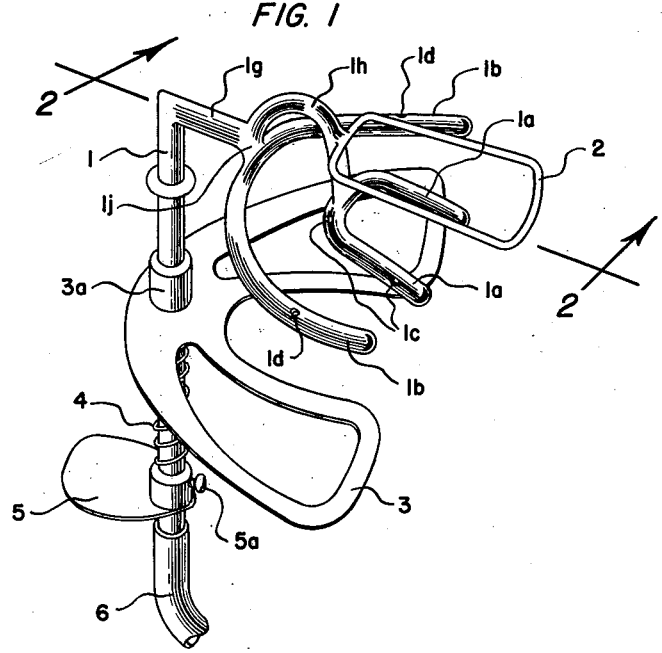
Figure 2:
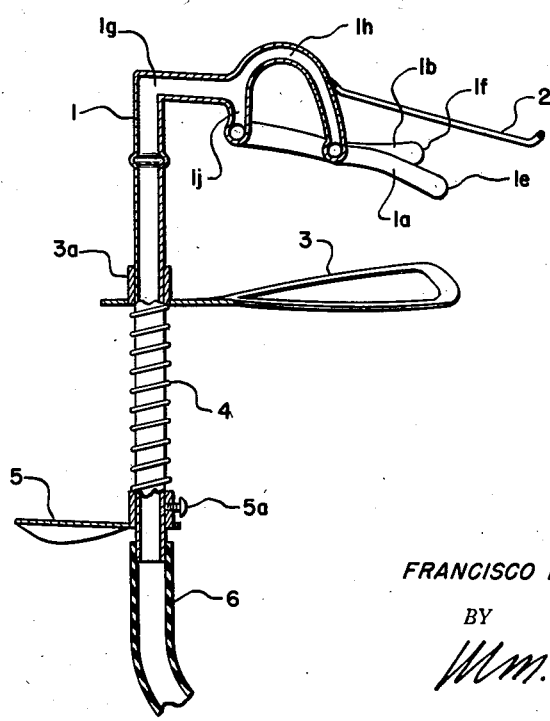

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a perspective view of my dental appliance, and Fig. 2 is a vertical sectional view thereof, taken from the line 2—2 of Fig. 1.

Similar characters of reference refer to similar parts and portions throughout the several views of the drawings.

The manifold 1, tongue depressor 2, chin plate 3, spring 4, thumb plate 5, and vacuum tube 6, constitute the principal parts and portions of my dental appliance.

The manifold 1 is a hollow tubular member, shown best in Fig. 2 of the drawings, which communicates with the interior of the tube 6 at the lower end of my dental appliance, and which communicates with the interior of the hollow sub-lingual forks 1a and vestibular forks 1b, shown in Fig. 1 of the drawings. The sub-lingual forks 1a are each provided with openings 1c in the side walls thereof, and the vestibular forks 1b are provided with openings 1d, communicating with the interior thereof.

As shown in Fig. 2 of the drawings, the extremities 1e of the sub-lingual forks 1a are downwardly declining, while the extremities 1f of the vestibular forks 1b are inclined slightly upwardly.

The manifold 1 is provided with a portion 1g at substantially right angles which interconnects the vertical and horizontal portions of the manifold 1, as shown best in Fig. 2 of the drawings. The horizontal portion communicates with the inverted U-shaped manifold portion 1h, which communicates with the sub-lingual forks 1a and also communicates with the downwardly extending conductor 1i, which communicates with the vestibular forks 1b. It will be noted that the U-shaped portion 1h accommodates the upwardly extending lower teeth in the patient's mouth and that the chin plate 3 engages the lower portion of the patient's chin, while the spring 4 surrounding the manifold 1 exerts upward pressure on the chin plate 3, which is slidably mounted on the manifold 1 by means of the bearing 3a, integral with the chin plate 3.

The thumb plate 5 is fixed by means of the set screw 5a to the outer side of the manifold 1 and the tube 6 is secured over the lower end of the manifold 1 in frictional air-tight relationship therewith, all as shown best in Fig. 2 of the drawings. Fixed to the U-shaped portion 1h, which supports the sub-lingual forks 1a, is the tongue depressor frame 2. This tongue depressor frame 2 holds the patient's tongue downwardly against the sub-lingual forks 1a, and prevents the tongue from being moved into obstructing relation with the view or instruments of the dentist. This tongue depressor 2 is an open rectangular frame, engageable with the upper side of the tongue, which does not tend to gag the patient.

The operation of my dental appliance is substantially as follows:

The tube 6 is connected to a suitable source of vacuum and the forefinger and middle finger are placed on the chin plate 3, adjacent the bearing 3a, at opposite sides thereof, and the thumb of the operator is placed on the thumb plate 5, so that the spring 4 may be compressed by the downward movement of the chin plate 3 toward the thumb plate 5. When holding both the chin plate 3 and the thumb plate 5 adjacent each other in compression against the spring 4, the forks 1b and 1a are tilted downwardly toward the open mouth of the patient, and may be readily and easily introduced thereinto. While the patient's tongue is raised from the floor of the mouth, the sub-lingual forks 1a are introduced below the tongue, and the depressor 2 is engaged with the upper surface of the tongue. The vestibular forks 1b are placed around the arch and along the sides thereof, outwardly of the lower teeth, so that the vestibular forks 1b eject the saliva secreted by the parotid gland, while the sub-lingual forks 1a eject saliva from the lower portion of the patient's mouth, inwardly of the lower teeth.

In the event the secretion of the sub-lingual gland is excessive, a piece of cotton may be dampened in water and placed adjacent the holes 1c for removing the excessive saliva.

It will be noted that the compression of the spring 4 forces the chin plate 3, in secure engaged relation with the lower portion of the patient's chin, and tends to force the forks 1a and 1b downwardly into the lower portion of the patient's mouth, in order to efficiently remove saliva from the lowermost portion of the patient's mouth, for evacuating and exposing all of the lowermost teeth and adjacent tissues to the view of the operator.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a dental appliance, a manifold adapted to conduct vacuum having a hollow fork-shaped portion adapted to be placed in the vestibulary area of a patient's mouth, and a secondary hollow fork-shaped portion adapted to be placed in the sublingual area of a person's mouth, both of said fork portions having openings therein adapted to eject saliva from a person's mouth, an upwardly extending U-shaped manifold portion interconnecting said sub-lingual fork and said vestibulary fork, a tongue depressor secured on said upwardly extending U-shaped portion in vertically spaced relation with said sub-lingual fork for holding a patient's tongue downwardly against said sub-lingual fork.

2. In a dental appliance, a manifold adapted to conduct vacuum having a hollow fork-shaped portion adapted to be placed in the vestibulary area of a patient's mouth, and a secondary hollow fork-shaped portion adapted to be placed in the sub-lingual area of a person's mouth, both of said fork portions having openings therein adapted to eject saliva from a person's mouth, an upwardly extending U-shaped manifold portion interconnecting said sub-lingual fork and said vestibulary fork, a tongue depressor secured on said upwardly extending U-shaped portion in vertically spaced relation with said sub-lingual fork for holding a patient's tongue downwardly against said sub-lingual fork, said manifold having a vertically disposed portion, a chin rest slidably mounted thereon, and a spring adapted to force said chin rest upwardly toward said fork portions.

3. In a dental appliance, a manifold adapted to conduct vacuum having a hollow fork-shaped portion adapted to be placed in the vestibulary area of a patient's mouth, and a secondary hollow fork-shaped portion adapted to be placed in the sub-lingual area of a person's mouth, both of said fork portions having openings therein adapted to eject saliva from a person's mouth, an upwardly extending U-shaped manifold portion interconnecting said sub-lingual fork and said vestibulary fork, a tongue depressor secured on said upwardly extending U-shaped portion in vertically spaced relation with said sub-lingual fork for holding a patient's tongue downwardly against said sub-lingual fork, said manifold having a vertically disposed portion, a chin rest slidably mounted thereon, and a spring adapted to force said chin rest upwardly toward said fork portions, a thumb plate on said manifold supporting the opposite end of said spring from said chin plate.

4. In a dental appliance, a manifold adapted to conduct vacuum having a hollow fork-shaped portion adapted to be placed in the vestibulary area of a patient's mouth, and a secondary hollow fork-shaped portion adapted to be placed in the sub-lingual area of a person's mouth, both of said fork portions having openings therein adapted to eject saliva from a person's mouth, an upwardly extending U-shaped manifold portion interconnecting said sub-lingual fork and said vestibulary fork, a tongue depressor secured on said upwardly extending U-shaped portion in vertically spaced relation with said sub-lingual fork for holding a patient's tongue downwardly against said sub-lingual fork, said manifold having a vertically disposed portion, a chin rest slidably mounted thereon, and a spring adapted to force said chin rest upwardly toward said fork portions, a thumb plate on said manifold supporting the opposite end of said spring from said chin plate, a flexible tube communicating with the interior of said manifold.

FRANCISCO MORENO STADELMANN.

REFERENCES CITED

The following references are of record in the file of this patent:

UNITED STATES PATENTS

| Number | Name | Date |
|---|---|---|
| 1,042,133 | Marshall | Oct. 22, 1912 |

FOREIGN PATENTS

| Number | Country | Date |
|---|---|---|
| 201,839 | Great Britain | Aug. 9, 1923 |
| 242,045 | Switzerland | Sept. 2, 1946 |